United States Patent
Fogel et al.

(10) Patent No.: US 11,841,945 B1
(45) Date of Patent: Dec. 12, 2023

(54) SYSTEM AND METHOD FOR CYBERSECURITY THREAT DETECTION UTILIZING STATIC AND RUNTIME DATA

(71) Applicant: Wiz, Inc., Palo Alto, CA (US)

(72) Inventors: Aviel Fogel, Tel Aviv (IL); Udi Reitblat, Tel Aviv (IL); Alon Schindel, Tel Aviv (IL); Ami Luttwak, Binyamina (IL); Roy Reznik, Tel Aviv (IL); Yinon Costica, Tel Aviv (IL)

(73) Assignee: WIZ, INC., New York, NY (US)

( * ) Notice: Subject to any disclaimer, the term of this patent is extended or adjusted under 35 U.S.C. 154(b) by 0 days.

(21) Appl. No.: 18/045,046

(22) Filed: Oct. 7, 2022

(51) Int. Cl.
*G06F 21/55* (2013.01)
*G06F 21/53* (2013.01)

(52) U.S. Cl.
CPC ............ *G06F 21/554* (2013.01); *G06F 21/53* (2013.01); *G06F 2221/032* (2013.01)

(58) Field of Classification Search
CPC ... G06F 21/554; G06F 21/53; G06F 2221/032
See application file for complete search history.

(56) References Cited

U.S. PATENT DOCUMENTS

| | | | |
|---|---|---|---|
| 9,582,662 B1 * | 2/2017 | Messick | G06F 21/554 |
| 10,540,499 B2 | 1/2020 | Wailly et al. | |
| 11,005,860 B1 | 5/2021 | Glyer et al. | |
| 11,245,730 B2 * | 2/2022 | Bailey | H04L 63/1441 |
| 11,496,498 B2 * | 11/2022 | Wright | H04L 63/1416 |
| 11,507,672 B1 * | 11/2022 | Pagnozzi | H04L 63/0263 |
| 11,546,360 B2 | 1/2023 | Woodford et al. | |
| 11,570,090 B2 * | 1/2023 | Shen | H04L 45/46 |
| 11,645,390 B2 | 5/2023 | Vijayvargiya et al. | |
| 2013/0124669 A1 | 5/2013 | Anderson et al. | |
| 2018/0063290 A1 | 3/2018 | Yang et al. | |
| 2019/0207966 A1 | 7/2019 | Vashisht et al. | |
| 2020/0320845 A1 * | 10/2020 | Livny | G06F 21/566 |
| 2022/0086173 A1 * | 3/2022 | Yavo | H04L 63/1416 |
| 2022/0215101 A1 * | 7/2022 | Rioux | G06F 21/55 |

FOREIGN PATENT DOCUMENTS

EP 4160983 A1 * 4/2023 ......... H04L 63/1441

* cited by examiner

*Primary Examiner* — Christopher A Revak
(74) *Attorney, Agent, or Firm* — M&B IP Analysts, LLC (57) ABSTRACT

A system and method for improved endpoint detection and response (EDR) in a cloud computing environment configures a resource deployed in a cloud computing environment to deploy thereon a sensor, configured to listen on a data link layer for an event. The method further includes detecting a potential cybersecurity threat on the resource; sending a definition based on the cybersecurity threat to the sensor, wherein the definition includes a logical expression, which when applied to an event produces a binary outcome, and wherein the sensor is further configured to apply the definition to the event; determining that the potential cybersecurity threat is an actual cybersecurity threat in response to the produced binary outcome having a predetermined value; and generating an instruction to perform a mitigation action based on the actual cybersecurity threat.

30 Claims, 6 Drawing Sheets

SYSTEM AND METHOD FOR CYBERSECURITY THREAT DETECTION UTILIZING STATIC AND RUNTIME DATA

TECHNICAL FIELD

The present disclosure relates generally to detection of cybersecurity threats, and specifically to complementary solutions for cybersecurity threat detection utilizing static analysis and runtime data.

BACKGROUND

Cybersecurity threats come in many shapes and forms, such as malware, worms, cryptominers, man-in-the-middle attacks, code injection, misconfigurations, and so on. Different threats pose different risks, and can often be detected in different ways. As such, there are many solutions which detect different types of cybersecurity threats, each with advantages and disadvantages. Cloud computing platforms, such as provided by Amazon® Web Services (AWS), Google® Cloud Platform (GCP), Microsoft® Azure, and the like, are high value targets for attackers, and therefore their vulnerabilities are more likely to become cybersecurity threats. It is therefore extremely useful to detect such cybersecurity threats.

For example, agent based solutions are able to detect both runtime and stored data, allowing to form a complete picture of the cybersecurity status of a machine having the agent installed thereon. However, agent based solutions require heavy use of compute resources, such as processor and memory resources. This is due to the agent being deployed on the machine which is scanned. For endpoints in a network, this type of solution is impractical, as the use of those resources is reserved for performing the task of the endpoint machine. Furthermore, some agent solutions also require communication with a backend which provides definitions, rules, and the like, in order to enable the agent to scan for cybersecurity threats using up to date information. Additionally, some agent based solutions require root privileges, or are deployed as a privileged software container. This in itself is a security risk, as conveying such permissions is inherently risky. Therefore, as an endpoint detection and response (EDR) solution for a cloud computing production environment, agent based solutions fail at their objective, and indeed such solutions are rarely used on network endpoints due to the above mentioned reasons.

Agentless solutions, on the other hand, do not require an agent installed on a machine. These solutions include static analysis, for example of a disk of a machine, to determine what cybersecurity threats are present. However, such solutions likewise fail at providing a complete picture, since static analysis solutions do not have access to runtime data. Such agentless solutions also fail to provide real time threat detection, thereby potentially leaving cybersecurity threats with a response for prolonged periods of time.

Utilizing both types of solution is not practical, as there is overlap in the data of agent and agentless solutions, and the computational costs of deploying both solutions on a single network are great. This leads, in practice, to a choice between either type of solution, with the resignation that some threats will inevitably go undetected.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for improved endpoint detection and response (EDR) in a cloud computing environment. The method comprises: configuring a resource, deployed in a cloud computing environment, to deploy thereon a sensor, the sensor configured to listen on a data link layer for an event; detecting a potential cybersecurity threat on the resource; sending a definition based on the cybersecurity threat to the sensor, wherein the definition includes a logical expression, which when applied to an event produces a binary outcome, and wherein the sensor is further configured to apply the definition to the event; determining that the potential cybersecurity threat is an actual cybersecurity threat in response to the produced binary outcome having a predetermined value; and generating an instruction to perform a mitigation action based on the actual cybersecurity threat.

Certain embodiments disclosed herein also include a non-transitory computer readable medium having stored thereon causing a processing circuitry to execute a process, the process comprising: configuring a resource, deployed in a cloud computing environment, to deploy thereon a sensor, the sensor configured to listen on a data link layer for an event; detecting a potential cybersecurity threat on the resource; sending a definition based on the cybersecurity threat to the sensor, wherein the definition includes a logical expression, which when applied to an event produces a binary outcome, and wherein the sensor is further configured to apply the definition to the event; determining that the potential cybersecurity threat is an actual cybersecurity threat in response to the produced binary outcome having a predetermined value; and generating an instruction to perform a mitigation action based on the actual cybersecurity threat.

Certain embodiments disclosed herein also include a system for improved endpoint detection and response (EDR) in a cloud computing environment. The system comprises: a processing circuitry; and a memory, the memory containing instructions that, when executed by the processing circuitry, configure the system to: configure a resource, deployed in a cloud computing environment, to deploy thereon a sensor, the sensor configured to listen on a data link layer for an event; detect a potential cybersecurity threat on the resource; send a definition based on the cybersecurity threat to the sensor, wherein the definition includes a logical expression, which when applied to an event produces a binary outcome, and wherein the sensor is further configured to apply the definition to the event; determine that the potential cybersecurity threat is an actual cybersecurity threat in response to the produced binary outcome having a predetermined value; and generate an instruction to perform a mitigation action based on the actual cybersecurity threat.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a sensor deployed on a workload in a cloud computing environment, to complement detection of cybersecurity threats using static analysis techniques. A sensor is a software package executable on a machine, such as an endpoint machine. An endpoint machine (or simply "endpoint") may be, for example, a proxy, a gateway, a reverse proxy, a webserver, and the like. A sensor is able to deploy on an endpoint utilizing less resources than an agent, as the sensor is configured to retrieve and analyze less data than an agent software is. This is due to the sensor capabilities being complemented by a static analysis solution, such as a cybersecurity threat inspector.

In an embodiment, the sensor is configured to listen to a data link layer. For example, in an embodiment, a sensor is configured to listen for packets utilizing the extended Berkeley Packet Filter (eBPF) interface. In certain embodiments, the sensor is configured to request rules, definitions, and the like, from a sensor backend server. The sensor is configured, for example, to apply a rule from the requested rules, definitions, and the like to an event detected by listening on the eBPF interface of a machine on which the sensor is deployed. In certain embodiments, the sensor is configured to send an event to the sensor backend server, for example in response to determining that the event matches a predefined definition.

In certain embodiments the sensor is configured to send an event, for example based on a predetermined definition, to a sensor backend server, which is configured to store the event on a security graph. The security graph includes a representation of the cloud computing environment in which the endpoint is deployed. For example, the sensor may detect that the endpoint sent a network packet to an IP address which is associated with a known cybersecurity risk, such as a coin mining pool. The sensor is configured to generate a notification to a sensor backend server. In an embodiment, the sensor backend server is configured to generate an instruction for an inspection controller. The inspection controller, in turn, is configured to provision an inspector to inspect the endpoint for the presence of a cryptominer malware.

By performing runtime and static analysis in this manner, the overlap in detection between the sensor and inspector are reduced. Additionally, the sensor is able to initiate inspection by the inspector, which allows efficient prioritizing of inspection resources, thereby reducing time to detection of cybersecurity threats, which also reduces time to respond to cybersecurity threats.

Figure 1:
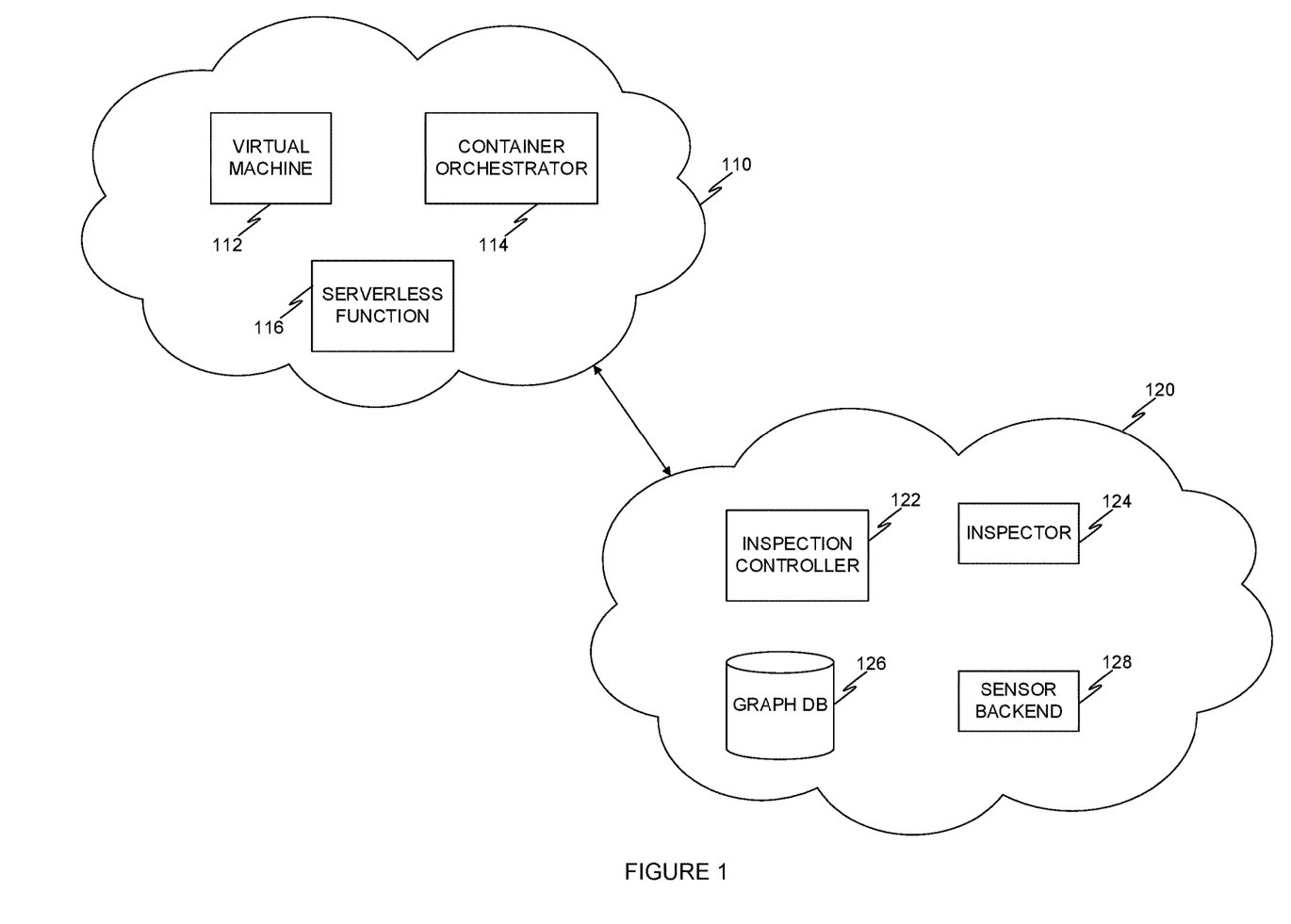
FIG. 1 is a schematic diagram of a cloud computing environment monitored for a cybersecurity threat by an inspection environment, implemented in accordance with an embodiment.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), and the like, over a cloud computing platform. A cloud computing platform may be provided, for example, by Amazon® Web Services (AWS), Google® Cloud Platform (GCP), Microsoft® Azure, and the like. A cloud computing environment 110 includes cloud entities deployed therein. A cloud entity may be, for example, a principal, a resource, a combination thereof, and the like. In an embodiment, a resource is a cloud entity which provides access to a compute resource, such as a processor, a memory, a storage, and the like. In some embodiments a resource is a virtual machine, a software container, a serverless function, and the like. A resource may be, or may include, a software application deployed thereon, such as a webserver, a gateway, a load balancer, a web application firewall (WAF), an appliance, and the like.

In certain embodiments, a principal is a cloud entity which is authorized to initiate actions in the cloud computing environment. A cloud entity may be, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

Each such resource is susceptible to various cybersecurity threats. Such threats can become apparent for example due to a software version of an application in a software container 114, an operating system (OS) version of a virtual machine 112, a misconfiguration in code of a serverless function 116, and the like. The cloud computing environment 110 is monitored for cybersecurity threats by an inspection environment 120. In an embodiment, the inspection environment is implemented as a cloud computing environment, such as a VPC, VNet, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. For example, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor. In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition. A definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource. In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example correspond to an IP address range used by a malware, such as a cryptominer. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates a an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In certain embodiments, the inspection environment 120 further includes a graph database 126, on which a security is stored. In an embodiment, the security graph is configured to store a representation of a cloud computing environment, such as cloud computing environment 110. For example, the representation may be based on a predefined unified data schema, so that each different cloud platform may be represented using a unified data schema, allowing for a unified representation. For example, a principal may be represented by a predefined data structure, each principal represented by a node in the security graph. Likewise, a resource may be represented by another predefined data structure, each resource represented by a node in the security graph.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security graph, generate a node in the security graph representing the virtual machine 112, and connect the node representing the malware with the node representing the virtual machine 112.

Figure 2:
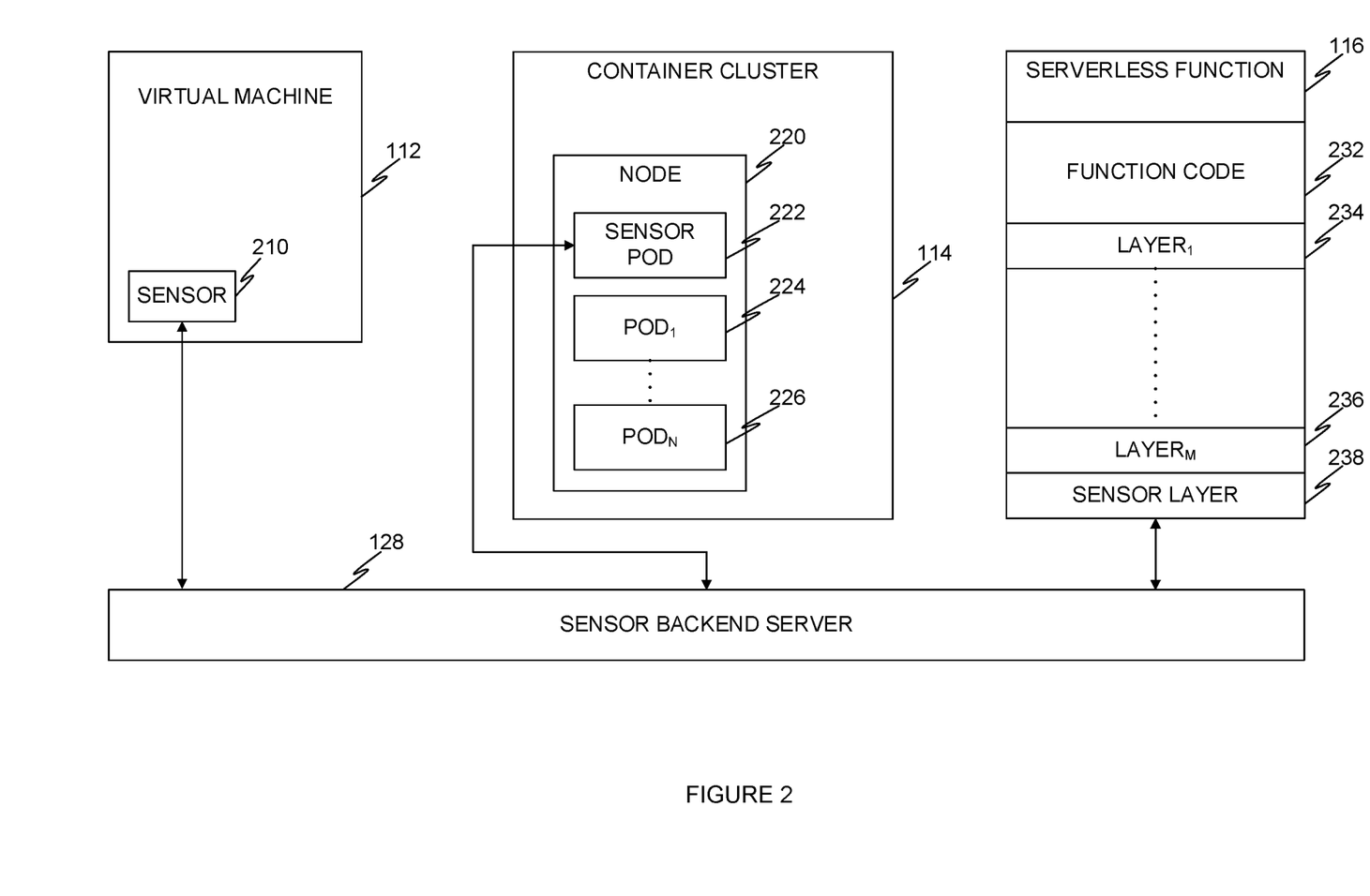
FIG. 2 is a schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 may be implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc. In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
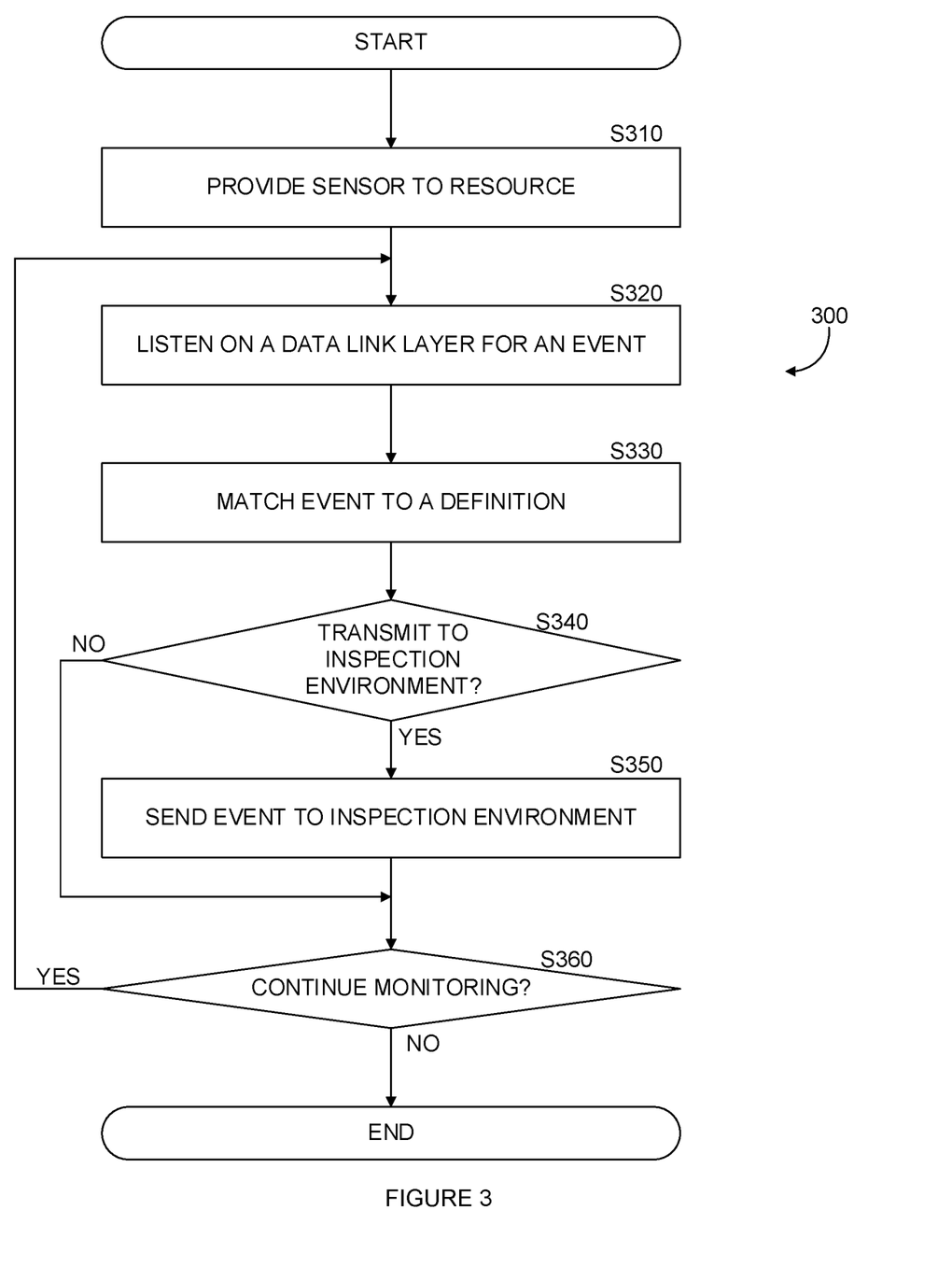
FIG. 3 is a flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1: "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32. so"
        last_seen: 1663138800
    }
    modules {
        path: "/usr/lib/libc-2.32. so"
        last_seen: 1663138800
    }
    modules {
        path: "/usr/lib/libtirpc.so.3.0.0"
        last_seen: 1663138800
    }
    modules {
        path: "/usr/lib/libnss_files-2.32. so"
        last_seen: 1663138800
    }
    modules {
        path: "/usr/sbin/rpc.mountd"
        last_seen: 1663138800
    }
```

```
listening_sockets {
   ip_addr: "0.0.0.0"
   port: 60311
}
listening_sockets {
   ip_addr: "0.0.0.0"
   port: 43639
}
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like. In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
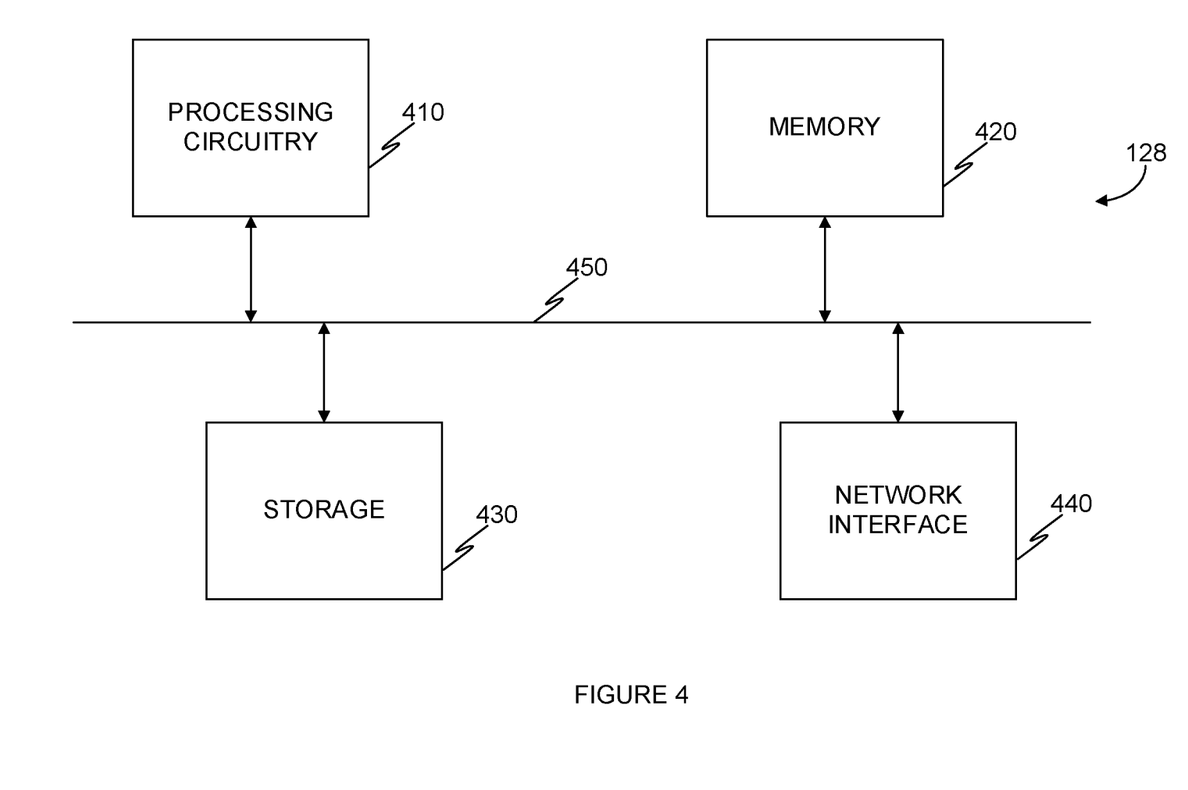
FIG. 4 is a schematic diagram of a sensor backend server according to an embodiment.

FIG. 4 is an example schematic diagram of a sensor backend server 128 according to an embodiment. The sensor backend server 128 includes a processing circuitry 410 coupled to a memory 420, a storage 430, and a network interface 440. In an embodiment, the components of the sensor backend server 128 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the sensor backend server 128 to communicate with, for example, a sensor 210, a daemonset pod 222, a sensor layer 238, and the like.

It should be understood that the embodiments described herein are not limited to the specific architecture illustrated in FIG. 4, and other architectures may be equally used without departing from the scope of the disclosed embodiments.

Furthermore, in certain embodiments the inspection controller 122, inspector 124, and the like, may be implemented with the architecture illustrated in FIG. 4. In other embodiments, other architectures may be equally used without departing from the scope of the disclosed embodiments.

Figure 5:
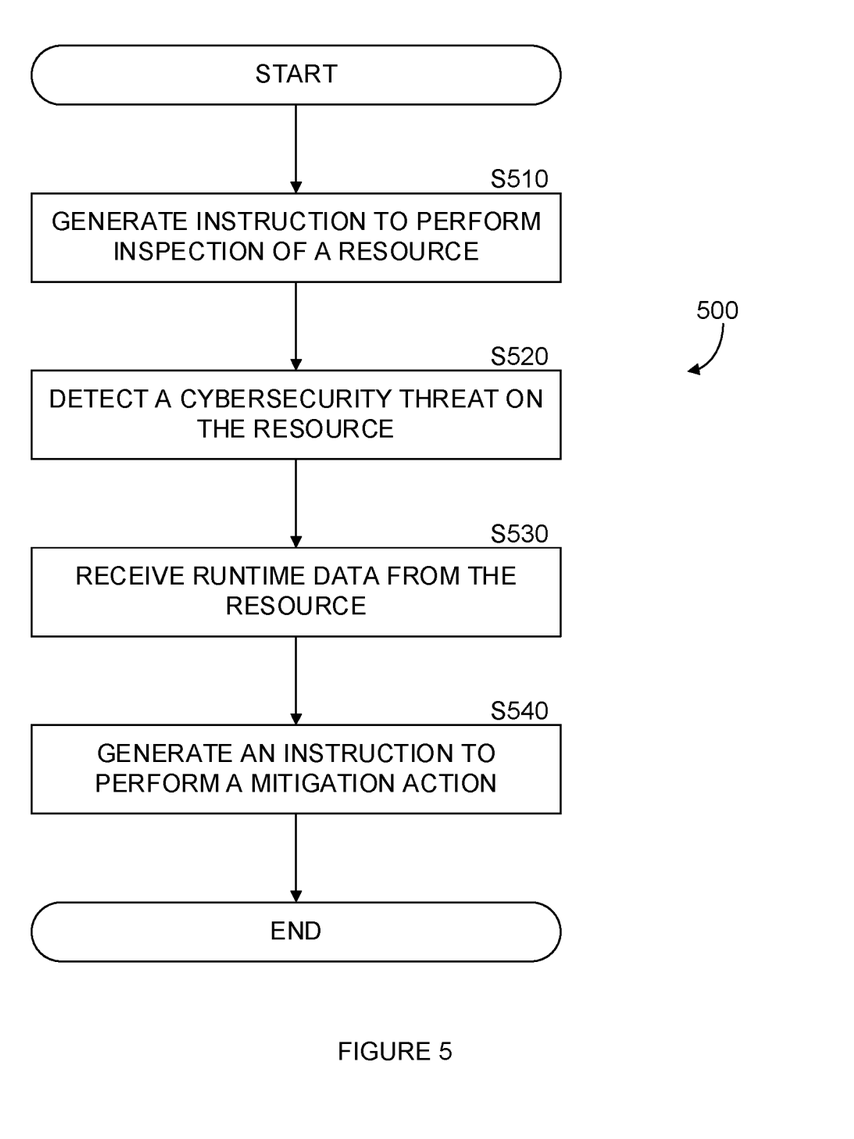
FIG. 5 is a flowchart of a method for mitigating a cybersecurity threat, implemented in accordance with an embodiment.

FIG. 5 is an example flowchart 500 of a method for mitigating a cybersecurity threat, implemented in accordance with an embodiment.

At S510, an instruction to perform inspection is generated. In an embodiment, inspection is performed on a resource, which may be, for example, a virtual machine, a software container, a serverless function, and the like. In an embodiment, the instruction, when executed, generates an inspectable disk based on a disk of a resource. For example, in an embodiment an inspectable disk is generated by performing a snapshot, a clone, a copy, a duplicate, and the like, of a disk attached to a virtual machine. The inspectable disk is accessible by an inspector. In an embodiment, the inspector utilizes static analysis techniques, for example to detect cybersecurity objects, such as a password, a certificate, an application binary, a software library, a hash, and the like.

The detected cybersecurity objects, cybersecurity threats, and the like, are represented, in an embodiment, in a security graph. For example, a node is generated in an embodiment to represent a malware object. The node representing the malware object is connected to a node representing the resource on which an inspector detected the malware object, to indicate that the malware object is present on the resource.

At S520, a cybersecurity threat is detected. In an embodiment, a cybersecurity threat is detected in response to detecting a cybersecurity object on a disk. In certain embodiments, a cybersecurity threat is an exposure, a vulnerability, a misconfiguration, a malware code object, a hash, a combination thereof, and the like. In some embodiments, a hash, which is detected or generated, is compared to another hash of a list of hashes which indicate know cybersecurity threats. For example, malware code objects are often detected by generating hashes of code objects and comparing them to hashes stored in a database of known hashes which are associated with malicious software. In certain embodiments, the cybersecurity threat is a potential cybersecurity threat. In an embodiment, runtime data is utilized to determine if the potential cybersecurity threat is an actual cybersecurity threat.

At S530, runtime data is received. In an embodiment, the runtime data is received from the inspected resource. In certain embodiments, runtime data is received based on cybersecurity objects detected by static analysis methods performed on the resource. For example, an inspector accessing an inspectable disk which is generated based on a disk of a virtual machine deployed in a cloud computing environment detects application libraries, which are cybersecurity objects. In an embodiment a definition is generated based on the detected cybersecurity objects. For example, a cybersecurity object may be a binary of application "xyz". A definition is generated based on the detected cybersecurity object, for example "Application xyz is deployed in runtime". In an embodiment, a rule is generated, for example based on the definition, further stating "IF application xyz is deployed in runtime, THEN perform mitigation action".

At S540, an instruction to perform a mitigation action is generated. In an embodiment, the instruction, when executed, initiates a mitigation action in the cloud computing environment in which the resource is deployed. In some embodiments, the mitigation action is generated based on the detected cybersecurity threat and the received runtime data. In certain embodiments, the mitigation action includes generating an alert, assigning a severity score to an alert (e.g., low, moderate, severe, critical), modifying a severity score of an alert, and the like.

While static analysis techniques can detect such cybersecurity objects and threats, runtime data is required to determine if the cybersecurity objects and threats are actually present in runtime. For example, a database having a misconfiguration, such as no password protection, is considered a cybersecurity threat. Typically, an alert is generated in response to detecting such a cybersecurity threat, and a mitigation action is initiated. However, in cloud computing production environments many such alerts are generated, and therefore it is desirable to prioritize alerts based, for example, on a severity of an event. In this example, if a process for managing the database is not present at runtime, then the severity of the cybersecurity threat is actually lower than if the database software was running, and therefore presented an actual cybersecurity threat. It is therefore beneficial to combine static analysis data with runtime data in an efficient manner in order to prioritize responses, such as mitigation actions, to detected cybersecurity threats. This allows to better utilize the compute resources of a cloud computing environment, and improving response time to cybersecurity threats based on actual severity.

Figure 6:
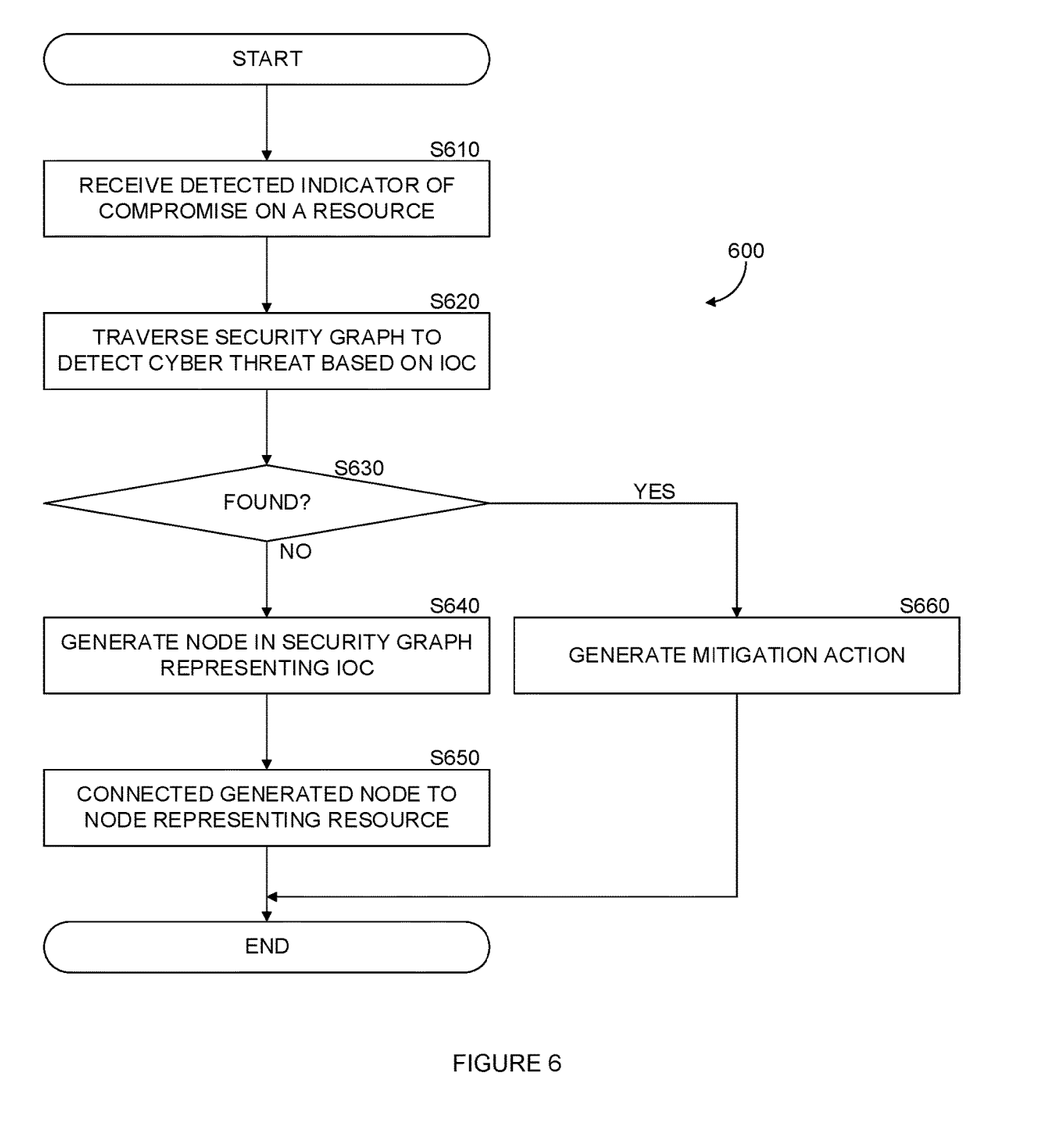
FIG. 6 is a flowchart of a method for utilizing a security graph in detecting a cybersecurity threat based on an indicator of compromise, implemented in accordance with an embodiment.

FIG. 6 is an example flowchart 600 of a method for utilizing a security graph in detecting a cybersecurity threat based on an indicator of compromise, implemented in accordance with an embodiment.

At S610, an indicator of compromise (IOC) is received. In an embodiment, the IOC is received from a sensor, the sensor configured to detect an IOC. In certain embodiments, an IOC is data, such as network traffic data, login data, access data, a data request, and the like. For example, IOC data indicates, in an embodiment, unusual network traffic, unusual login time, unusual logged-in user session time, a high volume of requests for data, network traffic to restricted domains, network traffic to suspicious geographical domains, mismatched port-application network traffic (i.e. sending command and control communication as a DNS request over port 80), and the like.

In certain embodiments, an IOC data is generated based on an aggregation of events detected on a resource, for example on a virtual machine. In an embodiment, a sensor is configured to store a plurality of events, and generate aggregated data based on the stored plurality of events. For example, network traffic destinations are stored, in an embodiment, to perform anomaly detection, i.e., to detect network traffic destinations which are anomalous.

At S620, a security graph is traversed to detect a cybersecurity threat. In an embodiment, an instruction is generated which, when executed by a graph database, configures a database management system to execute a query for detecting a node in a security graph stored on the graph database. In certain embodiments, the detected node represents a resource on which a sensor is deployed, the sensor generating the IOC data which is received at S610.

In certain embodiments, a security graph is traversed to detect a node representing a cybersecurity threat corresponding to the IOC and connected to a node representing the resource from which the IOC was generated. For example, a query is generated based on the IOC data and executed on the security graph. In an embodiment, execution of the query returns a result.

At S630, a check is performed to determine if the cybersecurity threat was found. In an embodiment, the check includes receiving a result from a query executed on a security graph, and determining if a node representing a resource is connected to a node representing a cybersecurity threat. If 'yes', execution continues at S660. If 'no' execution continues at S640.

At S640, a node is generated to represent the IOC in the security graph. In an embodiment, IOC data is stored with the node. In certain embodiments, an identifier of an IOC may be assigned to the IOC data, and the identifier of the IOC is stored with the node in the graph database.

At S650, an edge is generated to connect the node representing the IOC to a node representing the resource. In an embodiment the resource is a resource from which the IOC originated. For example, an edge may be generated to connected the node representing the IOC to the node representing the resource.

At S660, a mitigation action is generated. In an embodiment, generating a mitigation action includes generating an instruction which when executed configures a computing device to initiate the mitigation action. In an embodiment, the mitigation is initiating an inspection of the resource, generating alert an alert, a combination thereof, and the like. In certain embodiments the alert is generated based on any one of: the IOC data, an identifier of the resource, a predetermined rule, a combination thereof, and the like. In an embodiment, initiating inspection of a resource includes generating an instruction which when executed in a cloud computing environment configures the cloud computing environment to generate an inspectable disk, and provide an inspector workload access to the inspectable disk to inspect the inspectable disk for a cybersecurity threat corresponding to the IOC data.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improved endpoint detection and response (EDR) in a cloud computing environment, comprising:
   configuring a resource, deployed in a cloud computing environment, to deploy thereon a sensor, the sensor configured to listen on a data link layer for an event;
   detecting a potential cybersecurity threat on the resource based on data received from the sensor;
   sending a definition based on the cybersecurity threat to the sensor in response to detecting the potential cybersecurity threat, wherein the definition includes a logical expression, which when applied to an event produces a binary outcome, and wherein the sensor is further configured to apply the definition to the event;
   determining that the potential cybersecurity threat is an actual cybersecurity threat in response to the produced binary outcome having a predetermined value; and
   generating an instruction to perform a mitigation action based on the actual cybersecurity threat.

2. The method of claim 1, wherein the resource is a software container, further comprising:
   configuring a container cluster of the software container to deploy a daemonset, the daemonset including a plurality of nodes, each node including a daemonset pod, wherein the daemonset pod is the deployed sensor.

3. The method of claim 1, further comprising:
   sending a rule to the sensor, the rule including a logical expression and an action;
   configuring the sensor to apply the rule on the event; and
   configuring the sensor to perform the action in response to applying the rule on the event and receiving a predetermined result.

4. The method of claim 1, further comprising:
   detecting a cybersecurity object on the resource; and
   configuring the sensor to detect an event respective of the cybersecurity object.

5. The method of claim 1, further comprising:
   configuring the sensor to generate a software bill of materials (SBOM), the SBOM including data from a plurality of events, each event detected on the data link layer, wherein the data is any one of: an identifier of a library which is accessed in runtime, an identifier of a binary which is accessed in runtime, an image of which an instance is deployed in runtime, a port which is accessed by a runtime program, a cryptographic hash function value, and a combination thereof.

6. The method of claim 1, further comprising:
   terminating the sensor, in response to determining that a predetermined amount of time has passed, or a predetermined number of events were detected.

7. The method of claim 1, further comprising:
   generating an inspectable disk from a disk of the resource; and
   inspecting the inspectable disk for the potential cybersecurity threat.

8. The method of claim 7, further comprising:
   generating the inspectable disk by any one of: duplicating, copying, cloning, and generating a snapshot, of the disk of the resource.

9. The method of claim 8, wherein the inspectable disk includes a persistent volume claim (PVC) to an inspector workload, the inspector workload deployed in an inspection environment which is not the cloud computing environment.

10. The method of claim 1, further comprising:
    generating a node representing a cybersecurity threat in a security graph, wherein the security graph includes a representation of the cloud computing environment;
    generating a node representing the resource in the security graph; and
    connecting the node representing the resource to the node representing the cybersecurity threat with an edge representing a potential threat.

11. The method of claim 10, further comprising:
connecting the node representing the resource to the node representing the cybersecurity threat with another edge representing an actual threat; and
removing the edge representing the potential threat, in response to determining that the potential cybersecurity threat is an actual cybersecurity threat in response to the produced binary outcome having a predetermined value.

12. The method of claim 1, further comprising:
generating an alert based on the actual cybersecurity threat;
assigning the alert a severity value based on the potential cybersecurity threat;
updating the assigned severity value to a different value, in response to determining that the potential cybersecurity threat is an actual cybersecurity threat; and
updating the assigned severity value to another different value, in response to determining that the potential cybersecurity threat is not an actual cybersecurity threat.

13. A non-transitory computer readable medium having stored thereon instructions for causing a processing circuitry to execute a process, the process comprising:
configuring a resource, deployed in a cloud computing environment, to deploy thereon a sensor, the sensor configured to listen on a data link layer for an event;
detecting a potential cybersecurity threat on the resource based on data received from the sensor;
sending a definition based on the cybersecurity threat to the sensor in response to detecting the potential cybersecurity threat, wherein the definition includes a logical expression, which when applied to an event produces a binary outcome, and wherein the sensor is further configured to apply the definition to the event;
determining that the potential cybersecurity threat is an actual cybersecurity threat in response to the produced binary outcome having a predetermined value; and
generating an instruction to perform a mitigation action based on the actual cybersecurity threat.

14. A system for improved endpoint detection and response (EDR) in a cloud computing environment, comprising:
a processing circuitry; and
a memory, the memory containing instructions that, when executed by the processing circuitry, configure the system to:
configure a resource, deployed in a cloud computing environment, to deploy thereon a sensor, the sensor configured to listen on a data link layer for an event;
detect a potential cybersecurity threat on the resource based on data received from the sensor;
send a definition based on the cybersecurity threat to the sensor in response to detecting the potential cybersecurity threat, wherein the definition includes a logical expression, which when applied to an event produces a binary outcome, and wherein the sensor is further configured to apply the definition to the event;
determine that the potential cybersecurity threat is an actual cybersecurity threat in response to the produced binary outcome having a predetermined value; and
generate an instruction to perform a mitigation action based on the actual cybersecurity threat.

15. The system of claim 14, wherein the resource is any one of: a virtual machine having the sensor as a service deployed on an operating system of the virtual machine, and a serverless function including a function code and having the sensor as a code layer of the serverless function.

16. The system of claim 14, wherein the resource is a software container, and wherein the memory contains further instructions which when executed by the processing circuitry further configure the system to:
configure a container cluster of the software container to deploy a daemonset, the daemonset including a plurality of nodes, each node including a daemonset pod, wherein the daemonset pod is the deployed sensor.

17. The system of claim 14, wherein the sensor is configured to listen to the data link layer through an extended Berkeley Packet Filter (eBPF) interface.

18. The system of claim 14, wherein the memory contains further instructions which when executed by the processing circuitry further configure the system to:
send a rule to the sensor, the rule including a logical expression and an action;
configure the sensor to apply the rule on the event; and
configure the sensor to perform the action in response to applying the rule on the event and receiving a predetermined result.

19. The system of claim 18, wherein the memory contains further instructions which when executed by the processing circuitry further configure the system to:
send data pertaining to the event to a sensor backend server.

20. The system of claim 14, wherein the memory contains further instructions which when executed by the processing circuitry further configure the system to:
detect a cybersecurity object on the resource; and
configure the sensor to detect an event respective of the cybersecurity object.

21. The system of claim 14, wherein the memory contains further instructions which when executed by the processing circuitry further configure the system to:
configure the sensor to generate a software bill of materials (SBOM), the SBOM including data from a plurality of events, each event detected on the data link layer.

22. The system of claim 21, wherein the SBOM includes any one of: an identifier of a library which is accessed in runtime, an identifier of a binary which is accessed in runtime, an image of which an instance is deployed in runtime, a port which is accessed by a runtime program, a cryptographic hash function value, and a combination thereof.

23. The system of claim 14, wherein the memory contains further instructions which when executed by the processing circuitry further configure the system to:
terminate the sensor, in response to determining that a predetermined amount of time has passed, or a predetermined number of events were detected.

24. The system of claim 14, wherein the memory contains further instructions which when executed by the processing circuitry further configure the system to:
generate an inspectable disk from a disk of the resource; and
inspect the inspectable disk for the potential cybersecurity threat.

25. The system of claim 24, wherein the memory contains further instructions which when executed by the processing circuitry further configure the system to:
generate the inspectable disk by any one of: duplicating, copying, cloning, and generating a snapshot, of the disk of the resource.

26. The system of claim 25, wherein the inspectable disk includes a persistent volume claim (PVC) to an inspector workload, the inspector workload deployed in an inspection environment which is not the cloud computing environment.

27. The system of claim 14, wherein the memory contains further instructions which when executed by the processing circuitry further configure the system to:
   generate a node representing a cybersecurity threat in a security graph, wherein the security graph includes a representation of the cloud computing environment;
   generate a node representing the resource in the security graph; and
   connect the node representing the resource to the node representing the cybersecurity threat with an edge representing a potential threat.

28. The system of claim 27, wherein the memory contains further instructions which when executed by the processing circuitry further configure the system to:
   connect the node representing the resource to the node representing the cybersecurity threat with another edge representing an actual threat; and
   remove the edge representing the potential threat, in response to determining that the potential cybersecurity threat is an actual cybersecurity threat in response to the produced binary outcome having a predetermined value.

29. The system of claim 14, wherein the memory contains further instructions which when executed by the processing circuitry further configure the system to:
   generate an alert based on the actual cybersecurity threat.

30. The system of claim 29, wherein the memory contains further instructions which when executed by the processing circuitry further configure the system to:
   assign the alert a severity value based on the potential cybersecurity threat;
   update the assigned severity value to a different value, in response to determining that the potential cybersecurity threat is an actual cybersecurity threat; and
   update the assigned severity value to another different value, in response to determining that the potential cybersecurity threat is not an actual cybersecurity threat.

* * * * *